UNITED STATES PATENT OFFICE.

EBEN DOWIE AND JAMES MACDONALD OXLEY, OF MONTREAL, CANADA.

COMPOSITION FOR EXPELLING RATS, &c.

SPECIFICATION forming part of Letters Patent No. 631,738, dated August 22, 1899.

Application filed March 11, 1899. Serial No. 708,734. (No specimens.)

*To all whom it may concern:*

Be it known that we, EBEN DOWIE, consulting engineer, and JAMES MACDONALD OXLEY, insurance manager, of the city of Montreal, in the county of Hochelaga, in the Province of Quebec, Canada, have invented a certain new and useful Composition of Matter to be Used for Evicting Rats and other Vermin, of which the following is a specification.

Our composition consists of the following ingredients, combined in the proportions stated, viz: Chili pepper, twenty per cent.; hellebore, five per cent.; sulphate of lime, eight per cent.; phosphate of lime, eight per cent.; carbonate of lime, fifty-four per cent.; oxide of iron, five per cent. This mixture is thoroughly mingled and makes a fine powder. It is intended to be sprinkled on the premises where rats and other vermin are troublesome, and from its intense irritating and burning qualities effectually prevents the vermin from again invading the places where it has been used. It also does away with the great trouble of having the vermin die around the premises.

It is necessary that the hellebore and pepper have mixed therewith a medium to form a very light powder which will float on the air and permeate every place where used to eject the vermin. It would be impossible to use hellebore and pepper without the other ingredient, as it would be unbearable to human beings distributing it. The small percentage of pepper and hellebore used in the composition makes the same non-poisonous, thus preventing it from being a menace to the life of human beings and besides having the advantage of driving the vermin away without destroying them on the premises.

Although we show our powder as composed of the above ingredients, it will be understood that in place of the last four named ingredients we may use the ash from anthracite coal.

What we claim, and desire to secure by Letters Patent, is—

The herein-described composition of matter consisting of Chili pepper, hellebore, sulphate of lime, phosphate of lime, carbonate of lime and oxide of iron substantially in or about the proportions named.

Signed at Montreal, Canada, this 7th day of March, 1899.

EBEN DOWIE.
JAMES MACDONALD OXLEY.

Witnesses:
CLARENCE MEDLEY,
RICHARD COLLINS.